United States Patent [19]
Dydzyk

[11] Patent Number: 5,294,924
[45] Date of Patent: Mar. 15, 1994

[54] FLASHING WARNING LIGHT FOR A TRAFFIC CONTROL DEVICE

[75] Inventor: Dmytro Dydzyk, Anaheim, Calif.

[73] Assignee: CADS Electronic Systems, Inc., Irvine, Calif.

[21] Appl. No.: 824,074

[22] Filed: Jan. 23, 1992

[51] Int. Cl.⁵ .............................................. B60Q 7/00
[52] U.S. Cl. ................... 340/908.1; 340/471; 340/472; 340/473; 340/907; 340/908; 116/636
[58] Field of Search ............ 340/473, 472, 471, 908.1, 340/908, 907; 116/63 R, 63 P, 63 C

[56] References Cited

U.S. PATENT DOCUMENTS

| | | | |
|---|---|---|---|
| 2,949,531 | 8/1960 | Lemelson | 340/908.1 |
| 2,987,702 | 6/1961 | Yohe | 340/473 |
| 3,141,253 | 7/1964 | Bartram | 116/63 R |
| 3,221,300 | 11/1965 | Elledge, Jr. | 340/908.1 |
| 3,506,959 | 4/1970 | Nunn | 340/908.1 |
| 3,622,979 | 11/1971 | Dickerson | 340/473 |
| 4,516,109 | 5/1985 | Thurston | 340/908.1 |
| 4,772,869 | 9/1988 | Grammes et al. | 340/815.01 |

FOREIGN PATENT DOCUMENTS

0325255 7/1989 European Pat. Off. .......... 116/63 C

Primary Examiner—John K. Peng
Assistant Examiner—Edward Leftowitz
Attorney, Agent, or Firm—Hawes & Fischer

[57] ABSTRACT

A compact, ambient light sensitive flashing warning light that is removably attached to a traffic control device to alert on-coming motorists and pedestrians of a roadway condition. A photocell is connected between a light bulb and a battery voltage source so that illumination of the bulb can be made dependent upon ambient light conditions. The warning light includes a tapered attachment leg that is sized to fit through a hole in the top of a conventional hollow traffic cone, such that the warning light is removably attached to the cone by friction. As an alternate embodiment, the warning light may be interfaced with a bracket that is adapted to be fastened to other traffic control devices such as a conventional wooden barricade.

17 Claims, 3 Drawing Sheets

FLASHING WARNING LIGHT FOR A TRAFFIC CONTROL DEVICE

BACKGROUND OF THE INVENTION

1. Field of the Invention

This invention relates to a battery powered ambient light sensitive flashing warning light to be removably attached to a traffic cone, barricade or similar traffic control device to alert on-coming motorists and pedestrians to a potentially hazardous roadway condition.

2. Background Art

Cones, delineators, barrels and barricades have long been used as traffic control devices to alert motorists and pedestrians to hazards, detours, closures, construction and similar temporary roadway conditions. However, these traffic control devices are often hard to see, particularly when it is very dark or when adverse whether conditions prevail. At night, a motorist may have to depend solely upon his headlights reflecting off a distant traffic control device to enable the motorist to first locate the device and then execute a maneuver corresponding with the particular roadway condition. However, it may be difficult to distinguish the traffic control device from a crowded background, especially when the motorist is tired or driving at a high rate of speed. The foregoing can lead to an accident if the motorist is not able to quickly and accurately detect the presence of a traffic control device so as to allow sufficient time to react to the existing roadway condition and execute a required maneuver.

Battery powered warning lights have been used in the past in place of or along side traffic control devices. Such conventional warning lights typically have a large lens in the order of about eight inches in diameter. Moreover, two large six volt batteries are commonly included to power the light. The foregoing results in the conventional warning light being undesirably large, heavy and expensive to manufacture. This expense is compounded in the event that the conventional light needs to be replaced because of theft, breakage or malfunction.

It would therefore be desirable to have a compact light weight and relatively inexpensive warning light available to be easily and removably attached to a traffic control device to draw attention to said device and thereby alert on-coming motorists and pedestrians to a roadway condition in time to permit the motorist or pedestrian to properly react in accordance with such condition.

SUMMARY OF THE INVENTION

In general terms, a relatively compact, light weight and low cost battery powered ambient light sensitive flashing warning light is disclosed that is removably attached to a traffic control device (e.g. a traffic cone, a barrier, or the like) to alert on-coming motorists and pedestrians to a potentially hazardous roadway condition. The flashing warning light comprises a lens, a housing to which the lens is connected, a base which supports the housing and a tapered attachment leg that is removably connected to said base. In a first embodiment of the invention, the attachment leg is received within a hole that is cut into the top of a conventional hollow traffic cone, whereby the warning light is detachably connected to the cone by means of friction. A magnet is disposed within a cavity formed in the base, so that, with the attachment leg removed therefrom, the warning light may be coupled to various magnetic objects, such as an automobile. Resting upon the base and received within the housing of the warning light is a pair of 9 volt batteries to power a 5.1 volt light bulb. A photocell is electrically connected between the light bulb and the battery source so that the operation of the warning light can be made to depend upon the ambient light condition to which the warning light is subjected. The attachment leg includes a threaded pin projecting outwardly therefrom and sized to be removably received within a correspondingly threaded, hollow insert located in the magnet of the base. A push button switch is electrically connected between the batteries and the light bulb and axially aligned with the hollow insert. The pin of the attachment leg is sized to move into physical contact with and operate the push button switch for selectively controlling the illumination of the light bulb when said pin is received in the insert and the attachment leg is connected to the base.

As an additional embodiment of the invention, an L-shaped bracket adapter is connected to the warning light to enable the light to be interfaced with a conventional wooden barricade, or the like. The bracket adapter comprises a pair of arms that are coextensively connected to one another at a right angle. A first arm has a hole formed therein for receipt of the pin of the attachment leg, whereby said first arm will be retained between the attachment leg and the magnet at the base of the warning light. The second arm of the bracket adapter has one or more holes formed therein for receipt of screws or nails, whereby the adapter and the warning light associated therewith can be connected to the barrier.

DETAILED DESCRIPTION

Figures 1, 2:
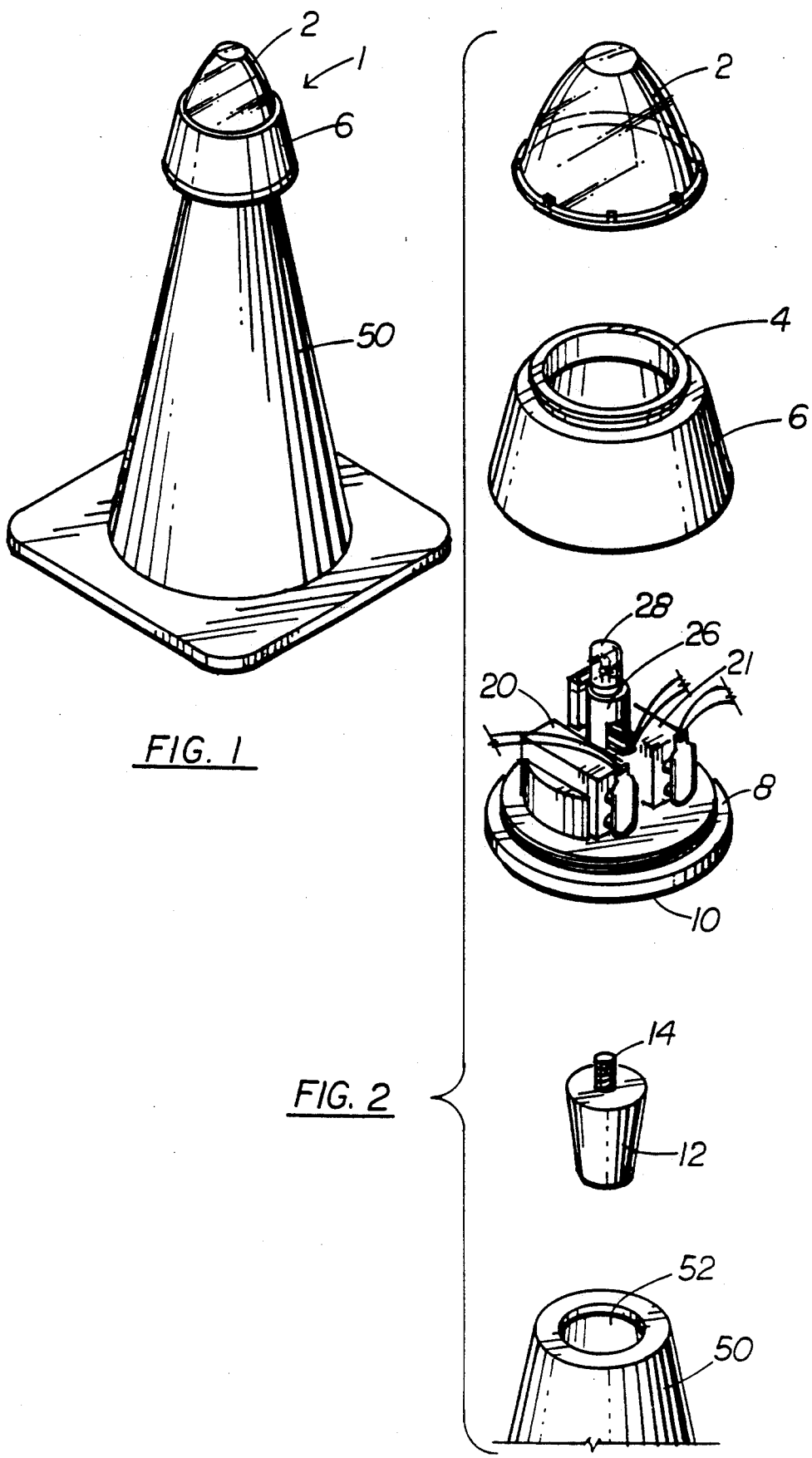
FIG. 1 is a perspective view showing the flashing warning light of the present invention removably connected to a conventional traffic cone.
FIG. 2 is an exploded view of the warning light of FIG. 1.

FIG. 1 of the drawings shows the flashing warning light 1 which forms the present invention removably attached to a conventional hollow traffic cone 50. As is best described while referring concurrently to FIGS. 1-5, the flashing warning light 1 includes a lens 2 which is typically formed from a plastic material having an amber, red, blue or other color tint. Alternatively, the lens 2 may be clear. In addition, ribs (not shown) may be provided to enhance visibility for on-coming vehicles and pedestrians. The lens 2 is snap-fit to a peripheral lip 4 formed at the top of a conical housing 6, such that, in the assembled relationship, the lens 2 projects upwardly from housing 6. The bottom of housing 6 is mated to a peripheral flange 8 formed at the bottom of a disk-shaped base 10. The housing 6 may be screw threaded and adapted to be mated to a corresponding set of screw threads extending around the flange 8 of base 10. A tapered attachment leg 12 is removably connected to warning light 1 at the bottom of base 10.

More particularly, the attachment leg 12 includes a threaded pin 14, one end of which is affixed to leg 12. As will be described in greater detail, the opposing end of threaded pin 14 is (adapted to be mated to a correspondingly threaded insert (designated 40 and best shown in FIGS. 3 and 5)) located in the bottom of base 10, whereby to detachably connect leg 12 to said base. The leg 12 of warning light 1 is of particular shape and size to be received through a hole 52 that is formed (e.g. cut) in the top of the normally closed traffic cone 50. The hole 52 of traffic cone 50 and the attachment leg 12 of warning light 1 are sized relative to one another so that leg 12 can be retained within hole 52 by means of-friction, whereby warning light 1 will be removably attached to cone 50 (best shown in FIG. 1). In this manner, the housing 6 of warning light 1 will sit upon the top of traffic cone 50.

The warning light 1 can be easily removed from traffic cone 50 by merely pulling housing 6 upwardly relative to cone 50, such that the pulling force is sufficient to overcome the frictional engagement of the attachment leg 12 by the cone. While the shape of attachment leg 12 is shown and described as being tapered, this is for purposes of illustration only, and attachment leg 12 may have any other suitable shape to be received within the hole 52 at the top of traffic cone 50 and fictionally engaged therein.

Figure 3:
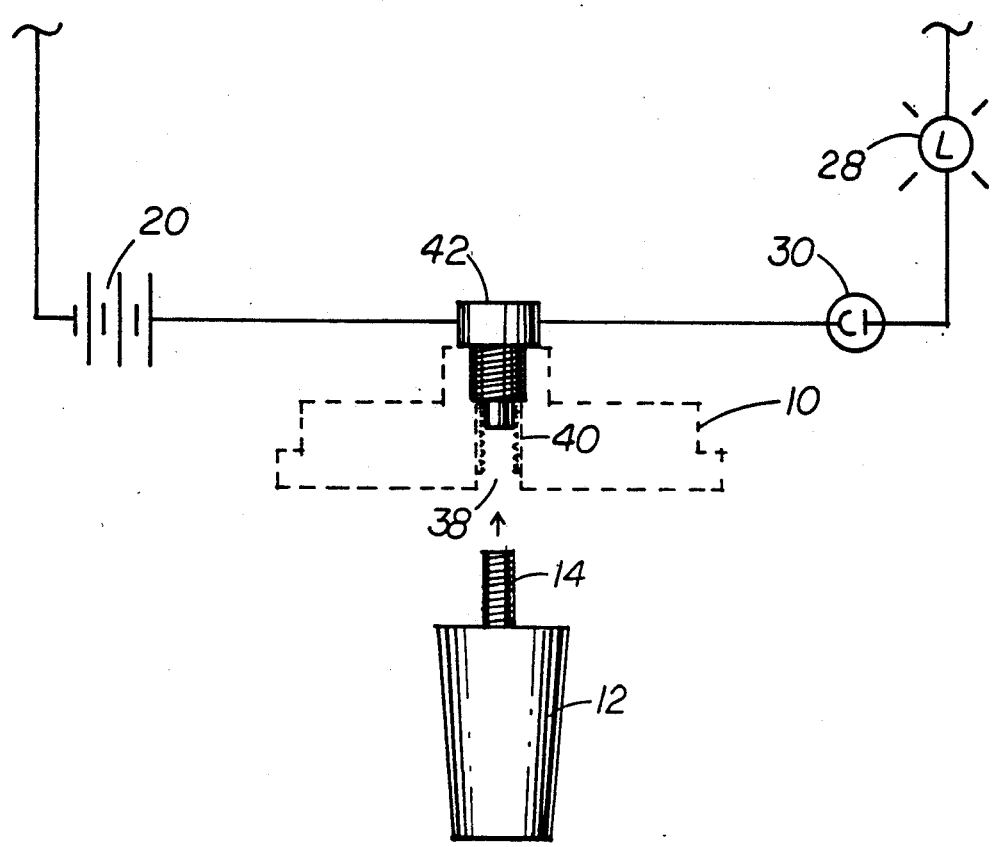
FIG. 3 is a partial schematic circuit illustrating the operation of a push button switch to selectively energize the warning light.
Figures 4, 5:
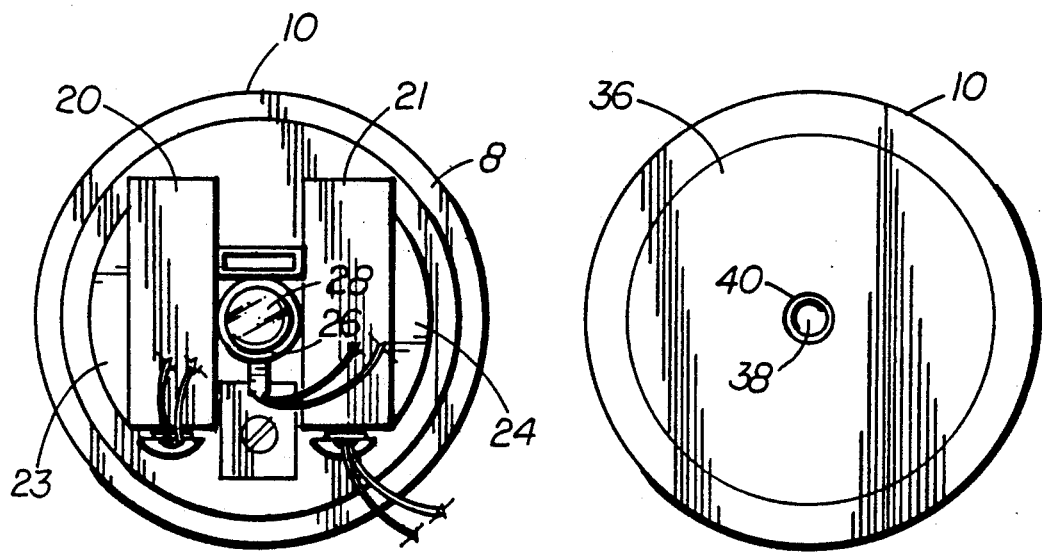
FIG. 4 is a top plan view of the warning light.
FIG. 5 is a bottom plan view of the warning light.

Details of the electronics for operating the flashing warning light 1 of the present invention are now described while referring particularly to FIGS. 3 and 4 of the drawings. Being that the electronic components of warning light 1 are well known, only a brief description thereof will be provided. Warning light 1 is powered by a pair of conventional 9 volt alkaline batteries 20 and 21 that are connected in electrical parallel with one another. The batteries 20 and 21 are surrounded by the housing 6 and supported upon the base 10 of light 1 between radially outer battery clips 23 and 24 and an inner light stand 26 which projects upwardly from the center of base 10 to provide support for a light bulb 28. Light bulb 28 is a commercially available bulb, such as, for example, a 5.1 volt bulb manufactured as Part No. K14 by General Electric Corporation. The illumination of bulb 28 is controlled by a commercially available photocell 30 and flasher circuit (not shown) that are connected between the bulb and the battery source. One example of a photocell 30 that is suitable for use herein is Part No. 260018 available from Kelvin Electronics of Plainview, New York. By virtue of the photocell 30, illumination of bulb 28 can be limited to those times of the day (typically from dusk to dawn) when both ambient light conditions and visibility are reduced to the point where a traffic cone would be hard to discern. Moreover, the use of photocell 30 helps to conserve energy by avoiding battery drain in daylight conditions when the use of light bulb 28 is not required.

An important feature of the present invention is disclosed while referring now to FIGS. 3 and 5 of the drawings, where the bottom of the base 10 of flashing warning light 1 is shown. Located within a cavity formed in the bottom of the base 10 is a disk-shaped magnet 36. A hole 38 is formed at the center of magnet 36, which hole communicates with a threaded, hollow insert 40. The presence of magnet 36 allows the flashing warning light 1, when the attachment leg 12 is removed therefrom, to be coupled to various magnetic bodies, such as a motor vehicle (not shown).

As was earlier disclosed, the attachment leg 12 is detachably connected to warning light 1 at the bottom of base 10. More particularly, the threaded pin 14 of attachment leg 12 is mated to the threaded insert 40 in base 10 via the hole 38 through magnet 36. What is more, and is as best illustrated in FIG. 3, the threaded pin 14 is sized to move through insert 40 and into physical contact with a push button switch 42 that is axially aligned with and accessible through insert 40, whereby to successively open and close switch 42 to correspondingly break and complete the circuit path between the batteries 20 and 21 and the light bulb 28 (of FIGS. 2-4). One example of a push button switch 42 that is suitable for use herein is a Series 188 push button switch manufactured by Judco Manufacturing Inc. of Harbor City, California. Thus, the movement of attachment leg 12 towards the base 10 of warning light 1 such that pin 14 is moved through insert 40 and into contact with switch 42 will permit the energization of bulb 28 to be selectively controlled regardless of the ambient light conditions to which light 1 is subjected. Similarly, instead of inserting the pin 14 of attachment leg 12 into insert 40, the energization of bulb 28 may also be selectively controlled by inserting a pencil or other narrow object through insert 40 and into contact with switch 42.

Figure 6:
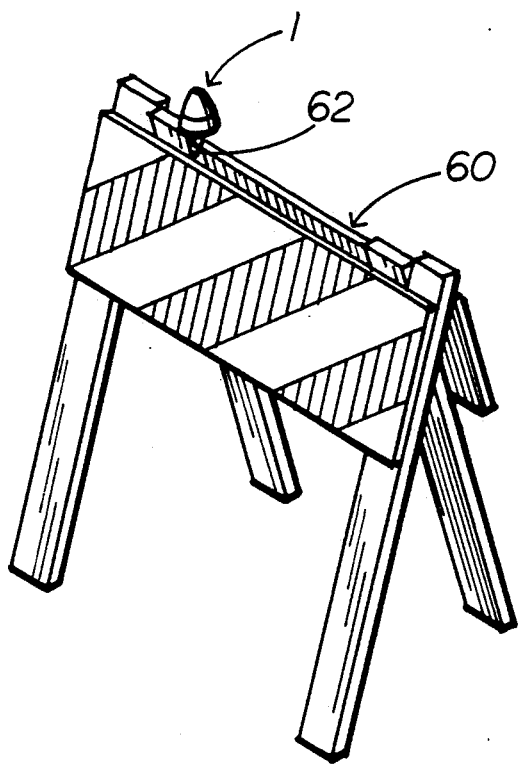
FIG. 6 is a perspective view showing the flashing warning light according to an alternate embodiment of the invention connected to a conventional wooden barricade.
Figure 7:
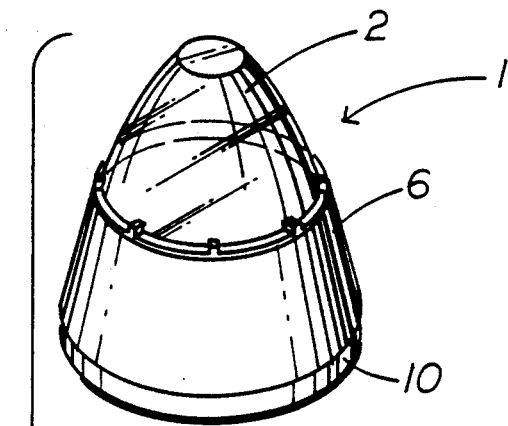
FIG. 7 is an exploded view of the warning light of FIG. 6.
Figure 7:
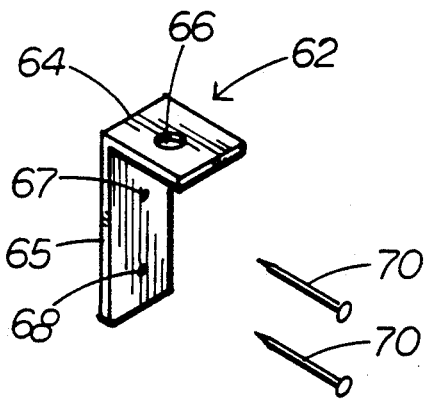
Figure 7:
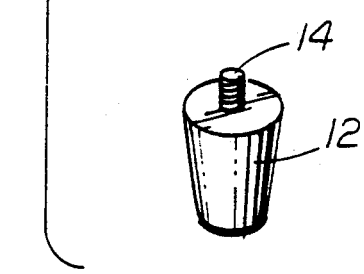

FIGS. 6 and 7 of the drawings show an additional embodiment of the present invention where the flashing warning light 1 that was previously described for use with a hollow traffic cone when referring to FIGS. 1–5 is now described for use with a conventional wooden barricade 60 to alert on-coming motorists and pedestrians to a potentially hazardous roadway condition. To this end, an adapter 62 is provided to enable the flashing warning light 1 to be interfaced with barricade 60. Adapter 62 includes a generally "L" shaped bracket comprising a pair of arms 64 and 65 that are formed from a magnetic material and coextensively connected to one another at a right angle. A hole 66 is formed through a first arm 64 of adapter bracket 62. Hole 66 is sized to accommodate therethrough the threaded pin 14 of attachment leg 12. Therefore, in the assembled relationship, with attachment leg 12 removably connected to the base 10 of warning light 1, the arm 64 of adapter 62 will be magnetically attracted to and will lie flush against the magnet 36 at the bottom of base 10 (best shown in FIG. 5) so that the hole 66 in arm 64 will be held in axial alignment with the threaded insert 40 in base 10. Thus, it will be a relatively simple task to mate threaded pin 14 to threaded insert 40 so that the arm 64 of adapter bracket 62 will be secured between attachment leg 12 and the magnet 36 of the base 10.

The other arm 65 of adapter bracket 62 includes one or more (e.g. two) holes 67 and 68 formed therethrough to accommodate nails, screws or other suitable fastening means 70. In this manner, a warning light 1 with which an adapter bracket 62 is associated ca be connected to a leg of the wooden barricade 60 (best shown in FIG. 6), a concrete barrier (not shown), or other traffic control devices which are not readily adapted to receive the attachment leg 12 therewithin.

It will be apparent that while a preferred embodiment of the invention has been shown and described, various modifications and changes may be made without departing from the true spirit and scope of the invention.

For example, the flashing warning light 1 has been shown in FIG. 1 of the drawings as being removably attached to a hollow traffic cone. It is to be expressly understood herein that warning light 1 may also be attached to other hollow traffic control devices, such as, for example, a delineator. In this case, the attachment leg 12 of warning light 1 would be received within the hollow body of the delineator as opposed to the hollow body of the traffic cone illustrated and described above. Likewise, the adapter bracket 62 of warning light 1 may be attached to a traffic control device other than the barricade 60 illustrated in FIGS. 6 and 7 of the drawings. For example, by utilizing suitable fastening means through holes 67 and 68, adapter bracket 62 would enable warning light 1 to be attached to a barrel, a concrete barrier, and any other traffic control device not having a hollow body within which to receive the attachment leg 12.

Having thus set forth a preferred embodiment, what is claimed is:

1. For attachment to a traffic control device, a warning light for alerting on-coming motorists and pedestrians to a roadway condition and comprising:
   a base above which a light bulb is supported;
   a source of supply voltage supported by said base and electrically connected to the light bulb to cause said bulb to be illuminated;
   a lens surrounding the light bulb above said base so that light is transmitted through said lens when the light bulb is illuminated;
   an attachment leg having a first end connected to said base and an opposite end to be connected to the traffic control device; and
   switch means electrically connected between said source of supply voltage and said light bulb, the first end of said attachment leg moving into physical contact with said switch means to control the operation thereof and the illumination of said light bulb when said first end is connected to said base.

2. The warning light recited in claim 1, wherein the first end of said attachment leg is detachably connected to said base.

3. The warning light recited in claim 2, wherein the first end of said attachment leg includes a pin extending therefrom and said base includes a hollow insert, said pin being removably received within said insert for detachably connecting said attachment leg to said base.

4. The warning light recited in claim 1, wherein said switch means is a push button switch supported by said base and aligned for engagement by the first end of said attachment leg when said first end is connected to said base.

5. The warning light recited in claim 1, further comprising a magnet located within said base.

6. The warning light recited in claim 1, further comprising a photocell electrically connected between said source of supply voltage and the light bulb to control the illumination of said bulb.

7. In combination:
   a traffic cone having an opening formed therein; and
   a warning light to alert on-coming motorists and pedestrians to a roadway condition and comprising housing means, a light bulb supported within said housing means, a source of voltage to illuminate said light bulb, switch means electrically connected between said voltage source and said light bulb, a lens surrounding said light bulb and coupled to said housing means so that light from said bulb is transmitted through said lens, and an attachment leg projecting from said housing means, a first end of said attachment leg received within the opening of said traffic cone by which said warning light is attached to said traffic cone and the opposite end of said attachment leg physically contacting said switch means to control the operation thereof and the illumination of said light bulb.

8. The combination recited in claim 7, wherein said housing means of said warning light includes a base above which said light bulb and said voltage source are supported, said attachment leg connected to and projecting from the base of said housing means.

9. The combination recited in claim 7, wherein said switch means of said warning light is a push button switch.

10. The combination recited in claim 7, wherein said attachment leg of said warning light is detachably connected to said base, the opposite end of said attachment leg moving out of physical contact with said switch means when said attachment leg is detached from the base of said housing means.

11. The combination recited in claim 7, wherein said attachment leg is tapered so to be releasably attached to the traffic control device within the opening thereof.

12. For attachment to a traffic control device, a warning light for alerting on-coming motorists and pedestrians to a roadway condition and comprising:
   a base from which a light bulb is supported;
   a source of supply voltage electrically connected to said light bulb to cause said light bulb to be illuminated;
   a bracket having at least first and second arms, said first arm connected to said base and said second arm to be attached to the traffic control device;
   switch means electrically connected between said source of supply voltage and said light bulb, said switch means carried by said base; and
   means connecting the first arm of said bracket to said base and including an attachment leg, a first end of said attachment leg penetrating said base and moving into physical contact with said switch means to control the operation thereof and the illumination of said light bulb when said bracket and said base are connected together.

13. The warning light recited in claim 12, wherein the first end of said attachment leg has a pin extending therefrom, said base has an opening therein, and the first arm of bracket has a hold extending therethrough, the pin of said attachment leg being received in the opening of said base by way of the hole in said first arm so as to both connect said bracket to said base and control the operation of said switch means carried by said base.

14. The warning light recited in claim 13, wherein said switch means includes a push button switch axially aligned with the opening in said base such that the pin of said attachment leg moves into physical contact with and operates said push button switch for controlling the illumination of said light bulb when said attachment leg is connected to said base and the pin of said attachment leg is received through the hole in the first arm of said bracket and in the opening of said base.

15. The warning light recited in claim 13, wherein the pin of said attachment leg is removably received through the hole in the first arm of said bracket and in the opening of said base, such that said bracket and said attachment leg are detachably connected to said base.

16. The warning light recited in claim 12, further comprising a photocell electrically connected between said source of supply voltage and the light bulb to control the illumination of the light bulb.

17. The warning light recited in claim 12, wherein said bracket has an L-shape, such that said first and second arms thereof are angled relative to one another.

* * * * *